Aug. 31, 1965     H. A. ÅKE WALLGREN ETAL     3,203,436
DISHWASHING MACHINE PROVIDED WITH CONTROL MECHANISM
Filed Feb. 25, 1964                              6 Sheets-Sheet 1

INVENTORS
Harold Anton Åke Wallgren
BY Kjell Åke Vilhelm Longren
ATTORNEY

| TIME (MINUTES) | 1 | 2 | 3 | 4 | 5 | 6 | 7 | 8 | 9 |
|---|---|---|---|---|---|---|---|---|---|
| CYCLE | PRE-RINSE | | WASHING | | | | | FINAL RINSE | |
| CONTROL MECHANISM MOTOR RUNNING. SWITCH S-27 CLOSED. | | ▓ | ▓ | ▓ | ▓ | ▓ | ▓ | ▓ | ▓ |
| MAIN MOTOR RUNNING. WATER PUMP OPERATING AND DISHES SPRAYED. DISH RACK ROTATING. SWITCH S-25 CLOSED. | | ▓ | ▓ | ▓ | ▓ | ▓ | ▓ | ▓ | |
| HOT WATER INTAKE OPEN. SWITCH S-24 CLOSED. | ▓ | | | | | | | ▓ | |
| SUMP BOTTOM DRAIN OPEN. | ▓ | | | | | | | ▓ | |
| SUMP BOTTOM DRAIN CLOSED. DETERGENT SUPPLIED FOR WASHING. SWITCH S-26 CLOSED. | | | ▓ | ▓ | ▓ | ▓ | ▓ | | |
| WETTING AGENT SUPPLIED FOR FINAL RINSE. SWITCH S-24 CLOSES FOR FINAL RINSE BEFORE SWITCH S-26 OPENS AT CONCLUSION OF WASHING PERIOD | | | | | | | | ▓ | |

INVENTORS
Harold Anton Åke Wallgren
BY Kjell Åke Vilhelm Longren

Their ATTORNEY

United States Patent Office 3,203,436
Patented Aug. 31, 1965

3,203,436
DISHWASHING MACHINE PROVIDED WITH CONTROL MECHANISM
Harald Anton Åke Wallgren, Alvsjo, and Kjell Åke Vilhelm Lovgren, Solna, Sweden, assignors to Aktiebolaget Elektrolux, Stockholm, Sweden, a corporation of Sweden
Filed Feb. 25, 1964, Ser. No. 347,178
Claims priority, application Sweden, Feb. 25, 1963, 2,048/63
9 Claims. (Cl. 134—58)

Our invention relates to dishwashing machines.

Dishwashing machines have been provided in which dishes and other articles to be washed are placed on a rack rotatably mounted within a casing and water is sprayed against them by stationary spraying means to which the water is supplied under pressure by a pump whose inlet is located in a sump at the bottom of the casing, the sump having an outlet or drain and a valve therefor for controlling the flow of water from the machine. It is desirable for water to flow continuously through a dishwashing machine of this type during the cleaning of the dishes, as when they are being rinsed before and after being washed with a detergent, for example. In order to operate the dishwashing machine with a minimum quantity of water, it is desirable to close the outlet or drain and to recirculate the water within the machine while the dishes are being washed with the detergent between the initial and final rinses, respectively.

It is an object of our invention to provide an improvement in dishwashing machines of this type for automatically cleaning dishes and other articles. We accomplish this by providing a dishwashing machine embodying provisions for automatically effecting a number of operations which includes washing and rinsing of dishes. Further, we provide suitable controls for governing and regulating the operating provisions, so that they will be performed in a desired order or sequence and with water being recirculated within the machine or flowing continuously therethrough. When the wishes are being washed, provision is made for automatically adding detergent to the water sprayed against the dishes. In order to provide clean dishes and glassware that sparkles and glistens and is free of objectionable streaks, provision also is made for automatically adding a wetting agent to the water sprayed against the dishes while they are undergoing final rinsing.

Further objects and advantages of our invention will become apparent as the following description proceeds, and the various features of novelty which characterize the invention are pointed out with particularity in the claims annexed to and forming a part of this specification.

For a better understanding of the invention, reference may be had to the following description taken in connection with the accompanying drawing, in which.

Figure 1:
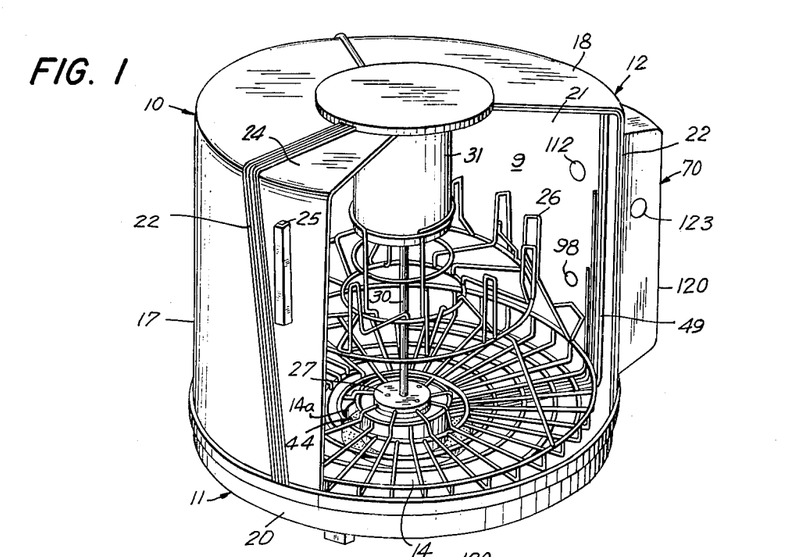
FIG. 1 is a perspective view of a dishwashing machine embodying our invention, the cover being open to illustrate the interior of the machine.
Figure 2:
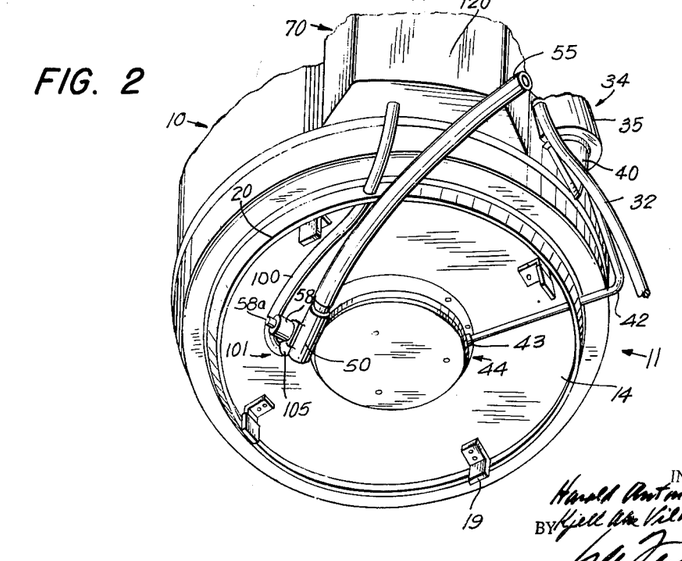
FIG. 2 is a bottom perspective view of the dishwashing machine shown in FIG. 1.

Referring to the drawing, the dishwashing machine embodying our invention comprises a cylindrical casing 10 having a base 11 and an upper part 12 defining a space 9. As shown in FIG. 2, the base 11 includes a bottom 14 provided with spaced feet or supports 19 positioned within an annular skirt or flange 20. The upper part 12 is formed with a wide angle opening 21 formed in an upstanding side wall 17 and flat top 18.

A door 24 having the same configuration as the side wall 17 and top 18 and provided with handle 25 is mounted for sliding movement in any suitable manner within a side wall 15 of the base 11. The door 24 is movable between its open and closed positions, a dish rack 26 within the casing 10 being accessible when the door is open. The dish rack is mounted on a rotatable member 27 which is arranged to be driven through reduction gearing disposed within the upper part of a housing 28 from a vertical shaft 29 extending upward through a hollow tube 30 within the casing 10. The shaft 29 at its upper end is connected to an enclosed electric motor 31 which is fixed to the underside of the top 18.

Liquid is supplied to the dishwashing machine in a liquid supply line which includes a flexible hollow tube 71 adapted to be connected at its outer end to a faucet or water tap. Liquid is conducted through the tube 71, a valve 72 and a liquid line 32 to a vacuum breaker 34 comprising a receptacle 35 having a top opening 36 beneath which is disposed an air vent tube 37 fixed to a horizontal plate 38. A drain opening 39 is provided at the bottom of receptacle 35 for draining liquid into a trough 40 from which liquid can pass through an opening 41 into the interior of the casing 10. Liquid is delivered tangentially into the receptacle 35 to impart a swirling movement to the liquid which passes from the receptacle through a conduit 42 connected to its side wall. The liquid passing through the receptacle 35 will be at atmospheric pressure and is discharged tangentially therefrom into conduit 42 which extends downward along the side of casing 10 and radially inward at the bottom of the casing, as best seen in FIG. 2.

The lower end of conduit 42 is connected at 43 to the side wall of a relatively shallow pan 44 which forms a sump 45 at the extreme bottom of the dishwashing machine. The pan 44 is formed with an outwardly extending flange 44a which is secured at 46 to the bottom 14 of base 11 about an opening 14a therein.

Figures 3, 4:
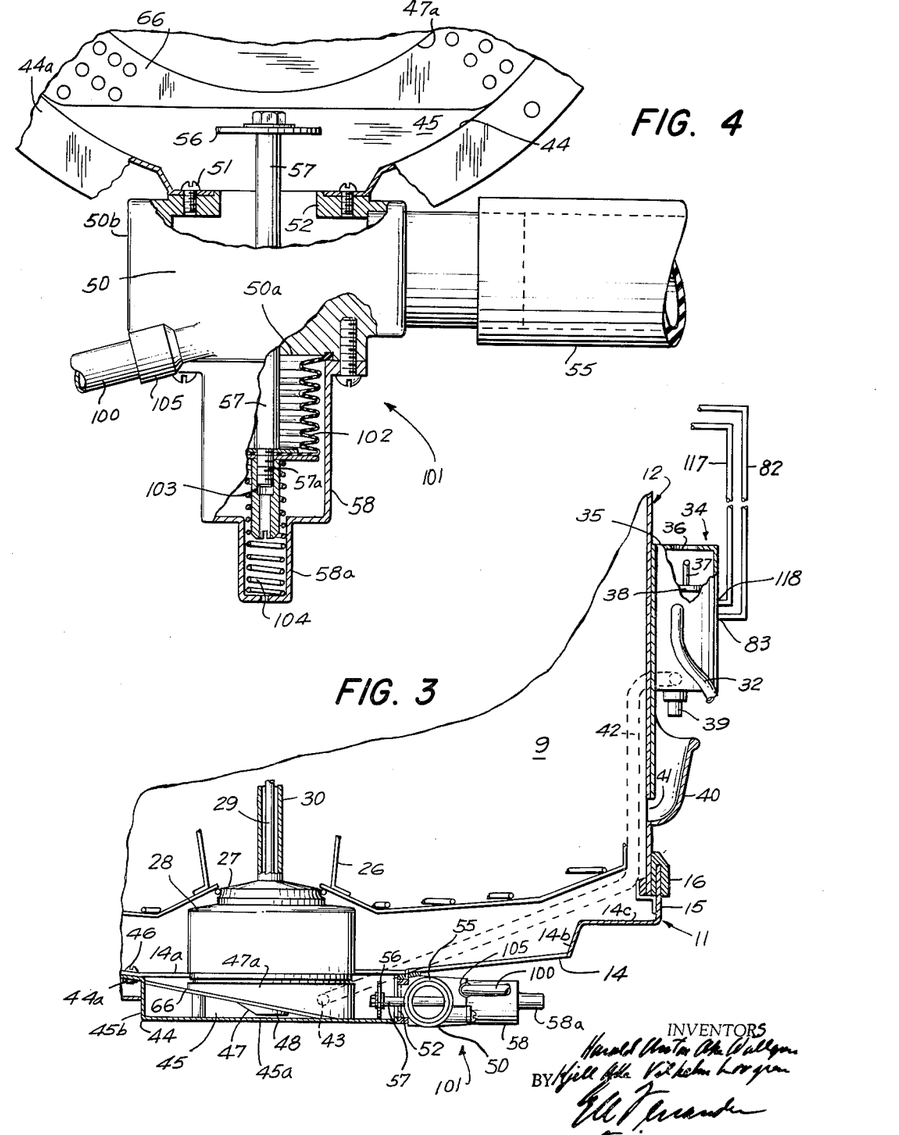
FIG. 3 is a fragmentary vertical sectional view of the dishwashing machine shown in FIGS. 1 and 2.
FIG. 4 is a fragmentary horizontal view, partly in section, of parts illustrated in FIG. 3.

The electric motor 31 drives the rotatable member 27 upon which the dish rack 26 is mounted, as explained above, and also a pump 47 which is connected to the lower end of vertical shaft 29. As best shown in FIG. 3, the inlet 48 of pump 47 is directed downward toward the bottom 45a of the sump 45 and is at a level below the region 43 at which liquid is delivered to the sump through the conduit 42. Liquid discharged from the pump 47 is delivered through a number of apertured tubes 49 which are spaced from one another and distributed within the space 9 for spraying dishes to be washed with liquid while they are being rotated past the tubes. Liquid collects in the bottom of the casing 10 and flows along the bottom 14 toward the sump 45, the bottom sloping downward toward the central opening 14a therein.

As seen in FIGS. 2, 3 and 4, a short pipe section 50 having an opening in its wall is fixed at 51 to the side wall 45b of the sump 45 with the pipe opening being in alignment with an opening in the side wall of the sump 45 and defining an outlet 52 for liquid discharged from the dishwashing machine. As shown in FIG. 3, the outlet extends through a vertical height in the sump 45 from the vicinity of the bottom 45a to the vicinity of the flange 44a. The liquid discharged from the outlet 52 flows into the pipe section 50, one end of which is closed at 50b and to the other end of which is connected a hollow flexible tube 55 for conducting liquid to waste.

A valve 56 for controlling flow of liquid through the outlet 52 is fixed to a rod 57 which extends through an opening in the wall of pipe section 50 into the interior of a cylindrical member 58. The valve 56 is normally biased to its open position and is moved to its closed position under certain operating conditions, as will be described hereinafter.

In order to prevent foreign matter from being drawn into the inlet 48 of pump 47 from the sump 45, an apertured plate 56 is provided in the sump which slopes downward toward the bottom edge of the outlet 52 from a diametrically opposite region of the sump 45 at a level at the vicinity of the flange 44a, as shown in FIG. 3. The apertured plate 66, which is formed with a central opening and is of annular form and encircles an upstanding wall 47a about the pump, in effect serves as a strainer and acts to direct toward the outlet 52 foreign matter collecting in the sump 45.

The dishwashing machine illustrated and described is like that disclosed in K. D. Lantz Patent No. 3,060,946, granted October 30, 1962. The disclosure in the aforementioned Lantz patent may be considered as being incorporated in this application, and, if desired, reference may be made thereto for a detailed description of the dishwashing machine.

The dishwashing machine can be operated by initially rinsing dishes and other articles to be washed. After placing the dishes on the dish rack 26 and closing the door 24, the motor 31 is rendered operable to drive the rotatable member or support 27 upon which the dish rack is mounted and the pump 47 will be rendered operable to withdraw water from the sump 45 and such water will be discharged from the pump and sprayed from the apertured pipes 49 against the dishes. The water discharged into the space 9 will flow by gravity toward the bottom 14 and collect in the sump 45.

It is desirable to initially rinse and flush dishes to be washed by continuously flowing water through the dishwashing machine. Therefore, the valve 56 is in its open position when initial rinsing of the dishes is being effected to enable liquid to flow from the sump 45 through the outlet 52 into the pipe section 50 and flexible tube 55 to waste. Under these conditions, water is continuously supplied to the dishwashing machine at such a rate that the water level in the sump 45 will be above the inlet 48 of the pump 47, so that the machine can be operated continuously to spray a portion of the continuously changing water supply in the sump against the dishes.

After the dishes to be washed have been initially rinsed, the dishes may then be washed by closing the valve 56 and supplying a definite quantity of water to the dishwashing machine. With detergent added to the water and the motor 31 still rendered operable to drive the rotatable dish rack 26 and to operate the pump 47, water will be recirculated in the machine for spraying water on the dishes. After an interval of time the valve 56 is moved to its open position and all of the washing liquid is drained from the machine. With all of the washing liquid drained from the machine and the valve 56 in its open position, water is again supplied to the machine, the motor 31 still being effective to rotate the dish rack 26 and operate the pump 47 to rinse the dishes. Under these conditions, water flows continuously through the dishwashing machine during the final rinsing of the dishes.

Figure 5:
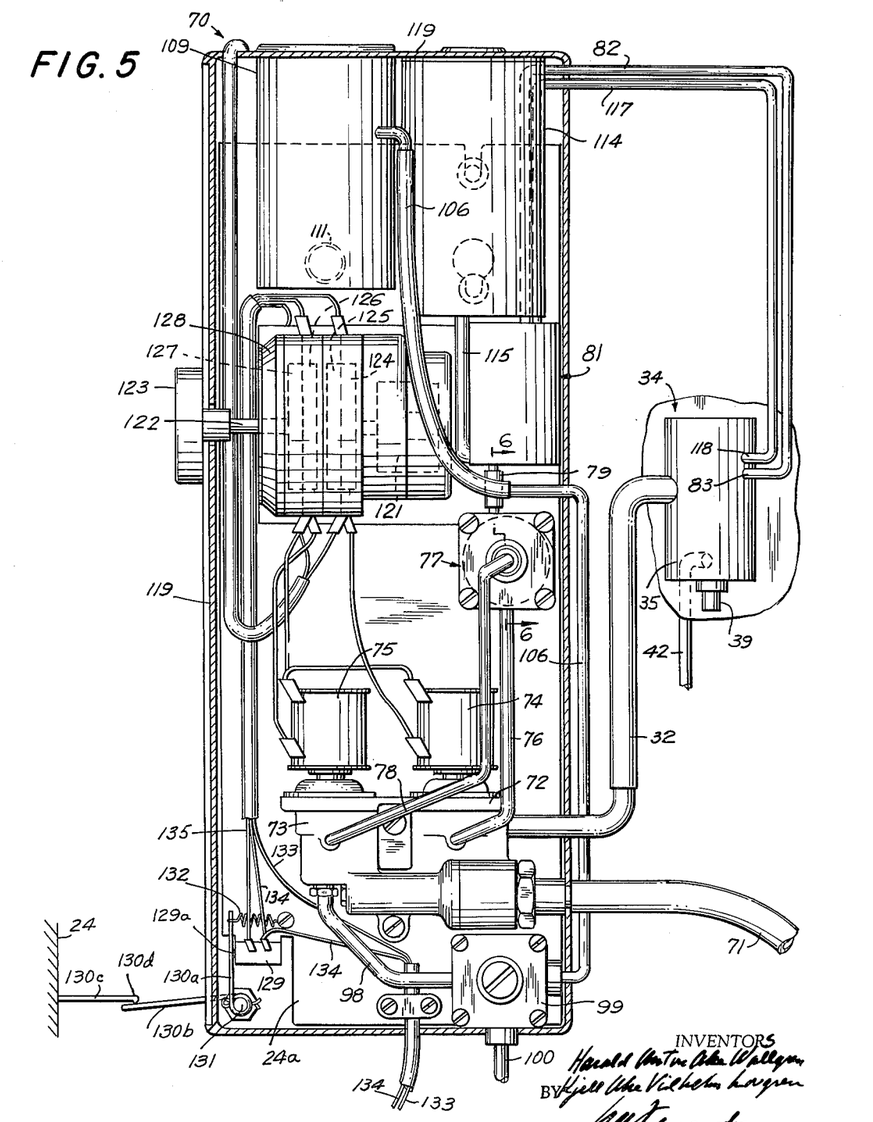
FIG. 5 is an enlarged view of the control mechanism embodied in the dishwashing machine shown in FIGS. 1 to 4, a side wall of the control housing being removed to illustrate the control mechanism therein in elevation with parts thereof broken away and in section.

In accordance with our invention, we provide control mechanism 70 which automatically renders the dishwashing machine operable to effect a number of operations which include washing and rinsing dishes and other articles to be cleaned. The control mechanism 70 includes the valve 72 and another valve 73 which are both connected to receive water through the conduit 71 from a source of supply, as shown in FIG. 5. The valves 72 and 73, which are normally closed and of the solenoid-operated type, are provided with solenoids 74 and 75, respectively, which open the valves when energized. From the valve 72 water flows into the interior of the dishwashing machine in a path of flow which includes the liquid line 32, vacuum breaker 34 and conduit 42 to the sump 45.

Figures 6, 7, 8:
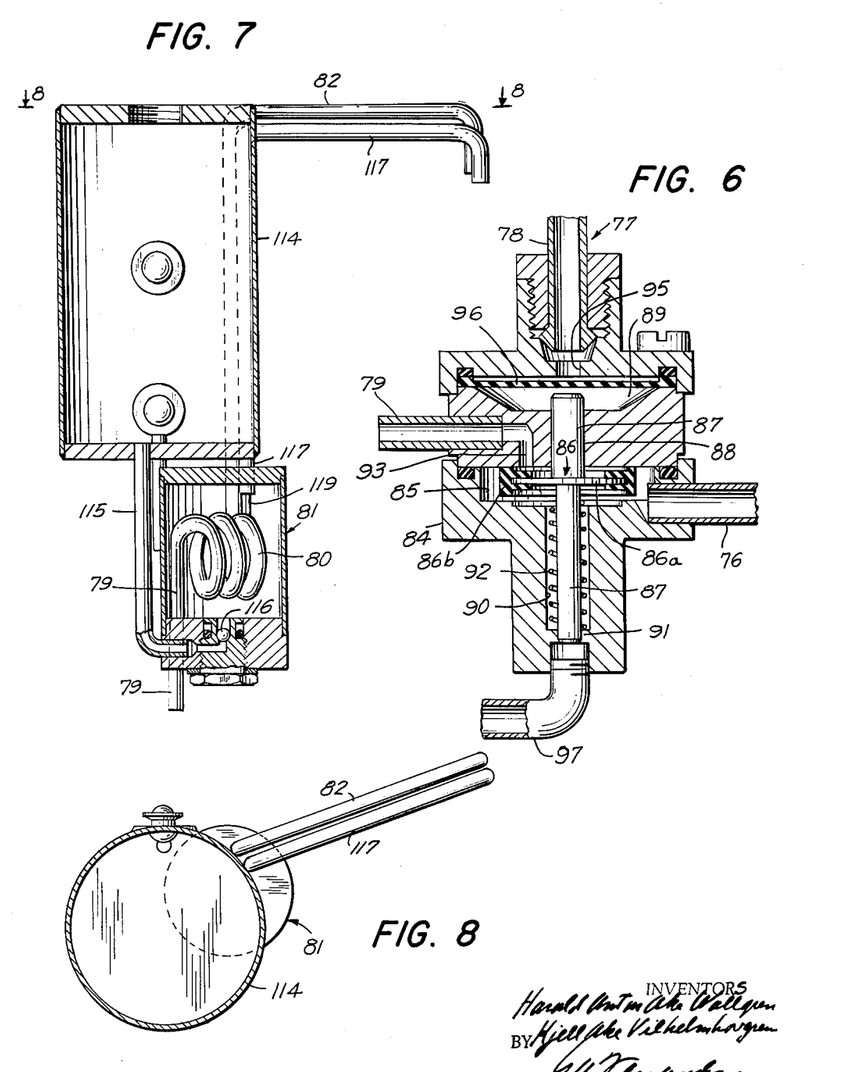
FIG. 6 is an enlarged fragmentary sectional view, taken at line 6—6 of FIG. 5, to illustrate details more clearly.
FIG. 7 is a fragmentary vertical sectional view of parts of the control mechanism shown in FIG. 5.
FIG. 8 is a top plan view taken at line 8—8 of the parts shown in FIG. 7.

From the valve 72 water also flows through a conduit 76 to a control device 77 which functions to control flow of water from conduit 76 to a conduit 79 connected to one end of a coil 80 within a vessel 81, the opposite end of which is connected to a conduit 82 which extends upward therefrom and is connected at 83 to the vacuum breaker receptacle 35. The control device 77 establishes communication between the conduits 76 and 79 responsive to the pressure of water in a conduit 78 which is in communication with the device 77 and into which water is introduced from valve 73. As shown in FIG. 6, the control device 77 includes a body 84 to which the conduits 76, 78 and 79 are connected. Water flowing through conduit 76 under pressure is introduced into a chamber 85 within which is disposed a valve member 86 fixed to a pin 87 having an upper part thereof snugly movable in a passage 88 and terminating in a second chamber 89 and a lower part which extends downward into a passage 90, the body 84 having a shoulder 91 at the bottom of the passage 90 defining an opening in which the pin 87 is movable. The valve member 86 is biased upward by a relatively weak coil spring 92 which is disposed about the lower part of the pin 87 and extends axially within the passage 90, the bottom of the spring bearing against the shoulder 91 and the top thereof bearing against the valve member 86.

The valve member 86, which comprises a disk 86a having a peripheral edge portion 86b of resilient material, is biased upward by the relatively weak spring 92 to close a port 93 with which the conduit 79 communicates. When valve 73 is closed and valve 72 is open and water can flow through conduit 76 into chamber 85, the water in the chamber 85 augments the biasing action of the spring 92 to hold valve member 86 in its upper closed position.

In FIG. 6 it will be seen that conduit 78 communicates with a port 95 in the body 84. A diaphragm 96 is provided in the chamber 89 which bears against the port 95 and is spaced from the upper end of the pin 87 when valve 73 is closed and valve 72 is open and the valve member 86 is held in its upper closed position responsive to the pressure of water which is introduced into the chamber 85 through the conduit 76 and acts against a relatively large area of the valve member 86.

Figures 9, 10:
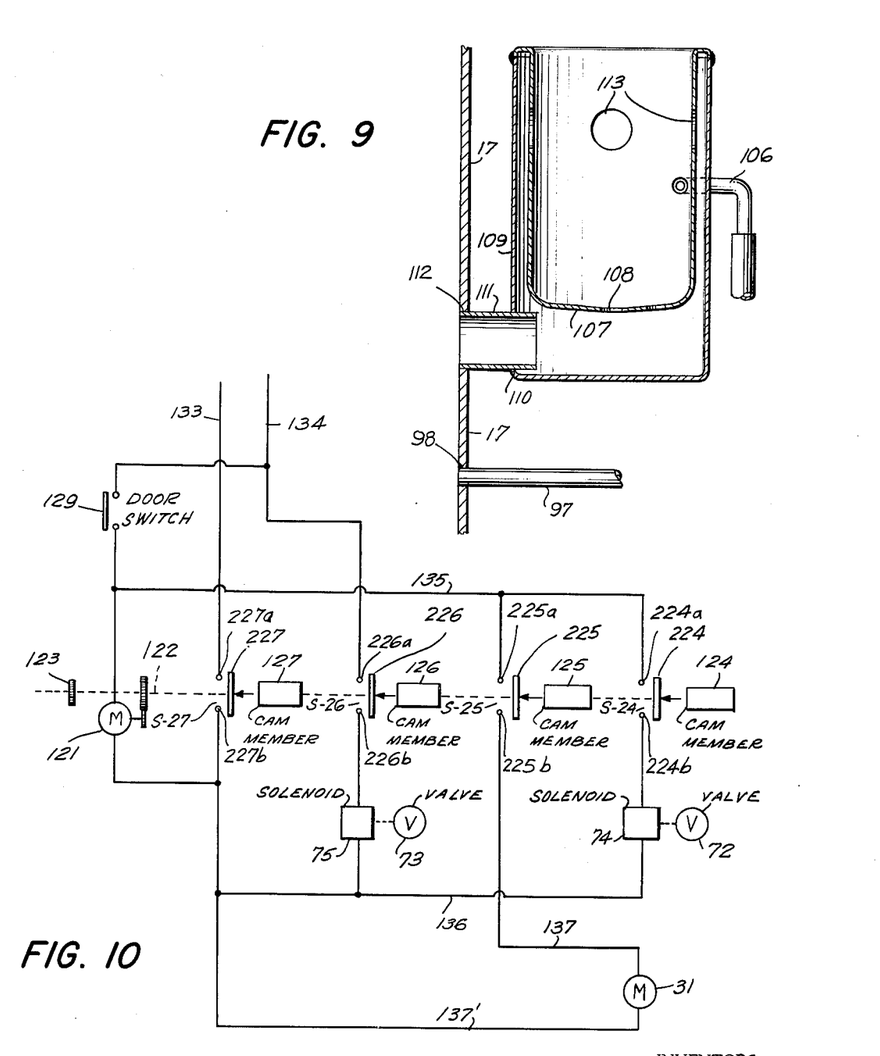
FIG. 9 is a fragmentary view, partly in section, of parts shown in FIGS. 1 and 5.
FIG. 10 is a diagrammatic representation of the electrical circuit of the control illustrated in FIG. 5.

When valve 73 opens while valve 72 is open, water is introduced into the conduit 78 and the diaphragm 96 moves downward responsive to the pressure of the water in the conduit 78. The diaphragm 96 is moved downward a sufficient distance to engage the pin 87 but, since the total force acting against the diaphragm 96 is less than the force acting against the valve member 86 by the water under pressure in chamber 85, the valve member 86 will remain in its upper closed position. Under these conditions, water leaks at a small rate from the control device 77 through the passage 90 and past the shoulder 91 therein into one end of a conduit 97, the other end of which is connected to the side wall 17 of the casing 10 at an opening 98 therein, as shown in FIGS. 1 and 9.

When valve 72 now closes while valve 73 remains open, water under pressure no longer is supplied through conduit 76 to chamber 85. Water under pressure in the conduit 78 is now effective to cause the diaphragm 96 to impart downward movement to the pin 87 and shift the valve member 86 from its upper closed position to a lower open position against the bottom wall of the chamber 85. Such downward movement of the valve member 86 can take place responsive to pressure of water in the conduit 78 because the pressure of the water in the chamber 85 will be relieved due to leakage of water therefrom through the conduit 97 into the casing 10 of the dishwashing machine. When the valve member 86 engages the bottom wall of the chamber 85, the valve member in such position will function to throttle water leakage through the passage 92 into the conduit 97.

Subsequently, when the valve 72 opens while the valve 73 is open, water will flow through conduit 76 into the chamber 85. With valve member 86 now in its lower open position, the port 93 will be uncovered and water can flow from conduit 76 through the control device 77 into conduit 79 and from the latter through the coil 80 and conduit 82 to the receptacle 35 of the vacuum breaker 34.

When valve 73 opens, water not only is introduced into conduit 78 which is connected to the control device 77, as just explained, but also is introduced into a conduit 98 for flow to a pressure reducing valve 99. Water at a reduced pressure flows from reducing valve 99 through conduit 100 to a device 101 which is operable to move the valve 56 at the bottom drain or outlet 52 of the dishwashing machine to its closed position.

The device 101 includes the cylindrical member 58. Within the member 58 is disposed a bellows 102 having an open end thereof fixed to an outer flat wall region 50a of the pipe section 50. The outer end of the rod 57 is provided with a reduced threaded portion 57a which extends through an opening in the closed end of the bellows 102 and is in sealing engagement therewith. One end of a hollow sleeve 103 is threaded to the reduced end portion 57a of the rod, the other end of which projects into and is guided in a reduced end section 58a of the cylindrical end member 58. The valve 56 is biased to its open position by a coil spring 104 which is disposed about the hollow sleeve 103 and extends between the closed end of the bellows 102 and the extreme end of the reduced end section 58a of the cylindrical member 58.

The conduit 100 is connected to a fitting 105 on the pipe section 50 which is formed with a passage for introducing water under reduced pressure into the interior of the bellows 102. When this occurs the bellows 102 expands and its closed end moves from the pipe section 50 against the biasing action of the spring 104, whereby movement is imparted to the rod 57 to cause the valve 56 to move to its closed position at the drain opening or outlet 52.

When the valve 73 closes and the interior of the bellows 102 no longer is subjected to the pressure of water introduced therein through the conduit 100, the spring 104 becomes effective to move the valve 56 to its open position. When this occurs the bellows 102 contracts and water is displaced from the bellows through conduit 100 and the reducing valve 99 and flows through a connection 106 to the interior of the casing 10, as will be explained presently.

The connection 106 forms part of a second line through which water flows at a reduced pressure from the reducing valve 99 when the valve 73 is open. Water flowing through the connection 106 is discharged tangentially in a receptacle 107 to impart a swirling movement to the liquid. The receptacle 107 is adapted to hold detergent in powdered form, for example, and the swirling movement of the water imparts a similar movement to the detergent. Water having powdered detergent in suspension therein flows through a bottom opening 108 in the receptacle 107 to another receptacle 109 within which the receptacle 107 is positioned.

The bottom part of the receptacle 109 is formed with an outlet 110 through which water having detergent in suspension therein is discharged and flows through a tubular member 111 which is connected to the side wall 17 of the casing 10 at an opening 112 therein, as shown in FIGS. 1 and 9.

The receptacle 107 is provided with a number of openings 113 in the side wall thereof above the region water is introduced therein through the connection 106. The openings 113 serve as overflow openings through which water can pass from the inner receptacle 107 to the outer receptacle 109 when the water does not flow freely through the opening 108 and the liquid level in the receptacle 107 rises.

It will now be understood that when valve 73 closes and the valve 56 moves to its open position, water displaced from the bellows 102 will flow through conduit 100 to the reducing valve 99 and from the latter to the casing 10 in a path of flow which includes connection 106, vessels 107 and 109, and tubular member 111.

A receptacle 114 which is arranged alongside the receptacle 109 is adapted to hold a body of wetting agent which flows downward therefrom by gravity through a conduit 115 into the lower end of the vessel 81. As shown in FIG. 7, a ball-type one-way valve 116 is provided in the bottom of the receptacle 81 to allow wetting agent to flow therein from the conduit 115 and prevent flow of wetting agent from the receptacle into the lower end of the conduit 115.

A conduit 117 extends upward from an upper part of the liquid holding space of the receptacle 81 for conducting wetting agent therefrom to the receptacle 35 of the vacuum breaker 34. As shown in FIG. 5, the conduit 117 is connected to the receptacle 35 at 118 at a region adjacent to the region 83 at which the conduit 82 is connected thereto. A flow-restricting element 119, which may be in the form of a wire, for example, extends upward within the lower end of the conduit 117 and reduces the rate at which the wetting agent can flow from the vessel 81 through the conduit 117 into the receptacle 35. The wetting agent mixes with water flowing into the receptacle 35 through the water supply line 32.

When wetting agent is not being conducted through the conduit 117 to the receptacle 35 of the vacuum breaker 34, the wetting agent in the vessel 81 rises into the lower end of the conduit 117 until the liquid surfaces in the vessel 114 and the conduit 117 are at the same level. When valve 73 is open and the valve member 86 of the control device 77 is in its open lower position in the chamber 85, the port 93 is uncovered and hot water can flow from the conduit 76 through the control device 77 and the conduit 79 into the coil 80. Under these conditions, the coil 80 functions as a heater and heat is transferred from the hot water in the coil 80 to the body of wetting agent in the receptacle 81. The volume of the body of wetting agent in the receptacle 81 increases as the result of heating effected by the coil 80 and causes the surface level of the wetting agent to rise sufficiently in the conduit 117 for the wetting agent to flow into the receptacle 35 of the vacuum breaker 34. As a practical matter the wetting agent under these conditions flows very slowly and is introduced into the vacuum breaker receptacle 35 drop by drop to mix with hot water flowing to the vacuum breaker through the liquid line 32.

The parts of the control mechanism 70 illustrated and described above, with the exception of the device 101 for controlling the valve 56 at the drain opening or outlet 52, are mounted on a base 119, as shown in FIG. 5. As shown in FIG. 1, a suitable cover 120 may be provided for the control mechanism 70 which is detachably secured to the base in any suitable manner.

The control mechanism 70 includes electrical components for controlling the motor 31, drain valve 56, and the solenoids 74 and 75 of the solenoid-operated valves 72 and 73, respectively. As shown in FIG. 5, the electrical components of the control mechanism include a control motor 121 which, through suitable reduction gearing, drives a shaft 122 which extends exteriorly of the cover 120 and to which is fixed a manually operable control member 123. To the shaft 122 are fixed four cam members 124, 125, 126 and 127. The control motor 121 and cam members 124, 125, 126 and 127 driven thereby may be enclosed within a casing 128, as shown in FIG. 5. In a well-known manner the rotatable cam members may be shaped to impart movement to movable members of switches having contacts with which the movable members cooperate at appropriate times while the cam members are being rotated. As diagrammatically shown in FIG. 10, the cam members 124, 125, 126 and 127 may cooperate with movable switch members 224, 225, 226 and 227, respectively, of switches S-24, S-25, S-26 and S-27 having contacts 224a-224b, 225a-225b, 226a-226b and 227a-227b.

It is desirable to move the door 24 of the casing 10 to its closed position before the dishwashing machine can be operated. Accordingly, a normally open switch 129 is provided with an operating member 129a which cooperates with an arm 130a that is pivotally mounted on a pin 131 extending through an opening in the base 119 and side wall 17 into the interior of the casing 10. An arm 130b within the casing, which also is pivotally mounted on the pin 131, is concealed from view by the side wall 15 of the base 11 and extends toward the door opening 21 and may be inclined downward from the horizontal. The lower part of door 24 is provided with an elongated switch actuating member 130c having its extremity 130d arranged to ride over the top surface of the arm 130b when the door is being moved to its closed position. Since the arms 130a and 130b are fixed to the pin 131 and form part of a unitary member, downward movement imparted to the arm 130b by the switch actuating member 130c will cause arm 130a to turn counter-clockwise against the action of a spring 132 and allow the switch operating member 129a which is biased to move outward, to move and effect closing of the switch 129. When the door 24 is opened and the elongated member 130c is clear of the arm 130b, the spring 132 will be effective to act on the arm 130a and impart movement to switch operating member 129a and open the switch 129.

Figure 11:
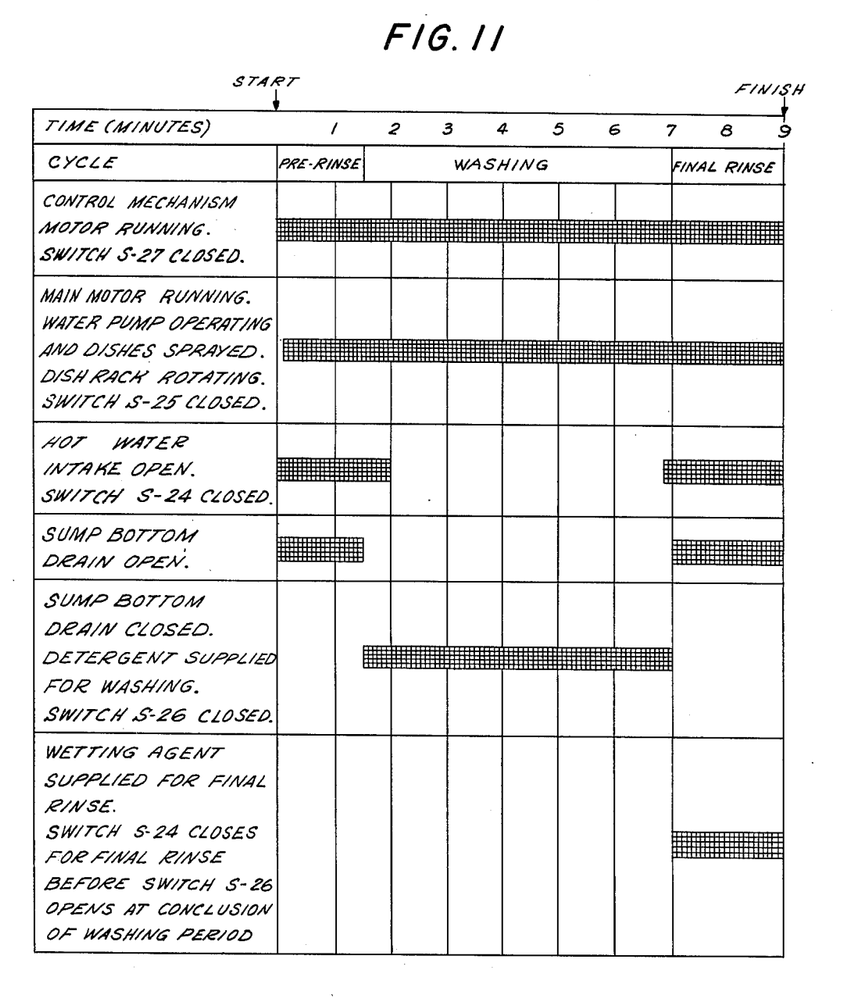
FIG. 11 is a chart diagrammatically illustrating a preferred cycle of operation of the dishwashing machine of FIGS. 1 to 4.

Referring to FIG. 11, a preferred cycle of operation for the dishwashing machine just described is diagrammatically depicted in which the several stages or periods of the cycle are listed horizontally across the top of the chart. The different acts effected during the cycle are listed vertically at the left-hand column of the chart. Under the headings of each stage or period of operation are blocked-out areas which indicate that particular acts are being effected, the length of each such area showing the duration or interval of time such act continues at the particular period of the dishwashing cycle. By way of example and without limitation, a dishwashing cycle like that depicted in FIG. 11, beginning with the pre-rinsing stage or period and terminating with the final rinsing period or stage, requires about nine minutes.

The dishwashing cycle depicted in FIG. 11 may be started by closing the door 24 to close the switch 129 in FIG. 5. The knob 123 in FIG. 5 is then manually turned to rotate the shaft 122 and render cam member 127 operable to cause switch member 227 to cooperate with contacts 227a-227b and close switch S-27. As shown in FIG. 10, this will complete an electrical circuit for the control motor 121 through conductors 133 and 134 which are connected to a source of electrical supply.

*Pre-rinse.*—This is the first stage or period of the dishwashing cycle depicted in the chart of FIG. 11. After this first stage is initiated by manually turning the knob 123 to effect closing of switch S-27 to complete the circuit for the control motor 121, the latter will commence to drive cam shaft 122. When this occurs the cam member 124 practically immediately will become operable to cause switch member 224 to cooperate with contacts 224a-224b and close switch S-24. As shown in FIG. 10, this will complete an electrical circuit for the solenoid 74 of solenoid-operated valve 72 through conductors 135 and 136 which are respectively connected to conductors 134 and 133.

When valve 72 opens, hot water under pressure will flow from a suitable source of supply through hollow tube 71, valve 72 and liquid line 32 to the vacuum breaker 34 from which hot water flows through conduit 42 to the sump 45 in the bottom of the casing 10. The drain valve 56 is biased to its open position by the spring 104 to allow water to flow from the bottom drain opening or outlet 52.

With valve 72 open, water also flows under pressure through the conduit 76 into chamber 85 of the control device 77, and, together with the aid of the spring 92, forces the valves 86 to its upper closed position to close the valve port 93.

After a fraction of a minute, as depicted in the chart of FIG. 11, the cam shaft 122 will have turned sufficiently for the cam member 125 to become operable to cause switch member 225 to cooperate with contacts 225a-225b and close switch S-25. As shown in FIG. 10, this will complete an electrical circuit for the motor 31 through conductors 135 and 137, 137' which are respectively connected to conductors 134 and 133. Closing of switch S-25 renders the motor 31 operable to drive the rotatable member 27 upon which the dish rack 26 is mounted and the pump 47 will be rendered operable to withdraw hot water from the sump 45 and discharge the withdrawn water through the apertured pipes 49 from which the hot water is sprayed against the dishes to pre-rinse and flush the dishes. As seen in the dishwashing cycle depicted in the chart of FIG. 11, the length of time of the pre-rinse period is about one and one-half minutes.

*Washing.*—This is the second stage or period of the dishwashing cycle depicted in the chart of FIG. 11. When this period commences the cam shaft 122 will have turned sufficiently for the cam member 126 to become operable to cause switch member 226 to cooperate with contacts 226a-226b and close switch S-26. As shown in FIG. 10, this will complete an electrical circuit for the solenoid 75 of the solenoid-operated valve 73 through conductors 133 and 134, respectively, to open valve 73. When this occurs water will flow from valve 73 through conduit 98 to reducing valve 99. Water at a reduced pressure flows from reducing valve 99 through conduit 100 to the device 101 which becomes operable to move the valve 56 to its closed position against the biasing action of the spring 104 and close the drain opening or outlet 52 at the bottom of the casing 10.

Water at a reduced pressure also flows from the reducing valve 99 through the connection 106 to the receptacle 107 in which the water swirls in the presence of detergent. Water with detergent in suspension therein flows through an opening 108 in the bottom of the receptacle 107 into an outer enveloping receptacle 109 from which the mixture of water and detergent flows from an outlet 110 through the tube 111 for discharge into the casing 10 of the dishwashing machine.

When the valve 73 opens, water also is introduced under pressure into conduit 78, whereby the diaphragm 96 in the control device 77 is forced downward against the upper end of the pin 88. As explained above, this downward force on the diaphragm 96 is insufficient to overcome the force of the water acting against the valve member 86 in the chamber 85 and the valve 86 will remain in its upper closed position responsive to force of the water supplied to the chamber through the conduit 76 from the valve 72.

In the chart of FIG. 11 it will be observed that hot water will be supplied for about one-half of a minute after the sump bottom drain 52 is closed by the valve 56. This will provide an adequate supply of hot water in the casing 10 to effect washing of the dishes by recirculating the water therein. When this occurs the control motor 121 will have turned the cam shaft 122 sufficiently for the cam member 124 to become ineffective whereby switch member 224 no longer will cooperate with contacts 224a–224b and switch S–24 opens. When this occurs the solenoid 74 of the solenoid-operated valve 72 becomes deenergized and the value 72 closes and the supply of hot water through the liquid line 32, vacuum breaker 34 and conduit 42 to the sump 45 stops.

When valve 72 closes and water under pressure is no longer introduced into conduit 76, the water under pressure in the conduit 78 and acting on the diaphragm 96 in the control device 77 will become effective to impart downward movement to the pin 88 against the biasing action of the spring 92. As explained above, downward movement of the pin 88 moves the valve 86 to its lower open position, the pressure in the chamber 85 being relieved by water leaking through the spring passage 90 into conduit 97 to be conducted into the casing 10.

As seen in the dishwashing cycle depicted in the chart of FIG. 11, the length of time of the washing period is about five minutes, during which period the pump 47 recirculates water in the casing and the water is discharged from the apertured pipes 49 against the dishes on the rotating dish rack 26.

In the last fraction of a minute of the washing period the cam shaft 122 will have turned sufficiently for the cam member 124 to become operable to cause switch member 224 to cooperate with contacts 224a–224b and close switch S–24. As seen in the chart of FIG. 11, this means that the solenoid 74 of the solenoid-operated valve 72 will become energized and open valve 72 before switch S–26 opens and valve 73 closes. Hence, water will flow from valve 72 through conduit 76 to chamber 85 of the control device while the valve 86 is forced downward to its lower open position responsive to the force of the water in conduit 78 resulting from the valve 73 remaining open. Under these conditions hot water will flow through the control device 77, coil 80 and conduit 82 to the vacuum breaker receptacle 35 and mix with hot water being supplied to the casing 10 from valve 72 through the liquid line 32.

*Final rinse.*—When the final rinse period commences the cam member 126 will no longer be effective to cause the switch member 226 to cooperate with the contacts 226a–226b and the switch S–26 opens. When this occurs the solenoid 75 of the solenoid-operated valve 73 becomes de-energized and the valve 73 closes. Under these conditions water will no longer be supplied to the reducing valve 99 from valve 73 and the valve 56 will move to its open position responsive to the biasing action of the spring 104 and the drain valve or outlet 52 opens to enable water to drain from the sump 45 and allow water to flow continuously through the dishwashing machine during the final rinse period. Closing of the valve 73 also stops flow of water through the connection 106 to the receptacle 107 in which detergent is held.

Further, water under pressure no longer will be introduced into the conduit 78 when the valve 73 closes. Hence, water under pressure will not act on the diaphragm 96 to impart downward movement to valve 86. However, valve 86 will remain in its lower open position while water continues to flow through the chamber 85 from the conduit 76 to the conduit 79 to which the coil 80 is connected.

The hot water flowing through the coil 80 during the final rinse period effects heating of wetting agent in the receptacle 81 to cause flow of the wetting agent through the conduit 117 into the vacuum breaker receptacle 35, as explained above. The wetting agent introduced into the receptacle in this manner mixes with hot water flowing through the conduit 42 to the sump 45.

The length of time of the final rinse is about two minutes. When the final rinse period ends, the cam member 125 will no longer be effective to cause the switch member 225 to cooperate with the contacts 225a–225b and the switch S–25 opens. When this occurs the motor 31 is de-energized and the pump 47 is rendered inoperable. Immediately thereafter the cam member 124 will no longer be effective to cause the switch member 224 to cooperate with contacts 224a–224b and the switch S–24 opens. This will de-energize the solenoid 74 of solenoid-operated valve 72 and the valve 72 closes.

When this occurs water no longer will flow through the conduit 76 to the chamber 85 of the control device 77 and the valve 86 will be biased to its upper closed position by the relatively weak spring 92.

Lastly, the cam member 127 will no longer be effective to cause the switch member 127 to cooperate with the contacts 227a–227b and the switch S–27 opens. When this occurs the control motor 121 is de-energized and stops, thus completing the dishwashing cycle with all of the cam members 124 to 127 returned to their starting positions.

When the door 24 now is opened to remove the cleaned dishes from the casing 10, the switch 129 opens and the dishwashing cycle cannot be repeated again until the door 24 is moved to its closed position to close the switch 129 and the control knob 123 is manually turned to render the cam member 127 operable to close switch S–27 and complete the circuit for the control motor 121.

After the dishwashing cycle is completed and the wetting agent in the receptacle 81 cools sufficiently, wetting agent displaced from the receptacle 81 through the conduit 117 during the final rinse period is replenished by wetting agent flowing by gravity from the receptacle 114 through the conduit 115 and one-way valve 116 until the liquid surfaces in the receptacle 114 and the conduit 117 are the same again.

When the dishwashing cycle is repeated in rapid succession, there is the possibility that the wetting agent in the receptacle 81 will not cool sufficiently for the dishwashing machine to function properly to supply wetting agent to the hot water during the final rinse period. In this event it may be desirable to provide an alternative arrangement in which a simple diaphragm or piston pump, which operates responsive to water under pressure introduced into conduit 79 when the valve 86 of control device 77 opens at the beginning of the final rinse period, can be employed to lift and transfer wetting agent from the receptacle 81 through the conduit 117 to the vacuum breaker receptacle 35. When the water employed is entirely satisfactory and will not cause streaking of dishes and glassware being cleaned, it may not be necessary to employ the control device 77 and receptacles 114 and 117 and connections therebetween for adding wetting agent automatically to the hot rinsing water in the final rinse period.

Modifications of the embodiments of our invention which have been described and illustrated will occur to those skilled in the art, so that it is desired not to be limited to the particular arrangements set forth. Therefore, it is intended in the claims to cover all those modifications and features which do not depart from the spirit and scope of the invention.

What is claimed is:

1. Dishwashing apparatus comprising a compartment for dishes to be washed having a drain outlet at the bottom thereof, first valve means for admitting liquid into said compartment, mechanism comprising a second valve means for closing said drain outlet to retain liquid in said compartment, a drive motor, means operated by said drive motor for circulating liquid through said compartment and for utilizing said circulating liquid to wash the dishes therein, sequence control means for controlling operation of said first and second valve means and said motor, said sequence control means including a first switch to energize said first valve means for admitting liquid to said compartment and a second switch to energize said drive motor and subject the dishes to a preliminary washing action for an interval of time representing a pre-rinse period during which said drain outlet is open and liquid can flow from said compartment, said sequence control means including a third switch to energize said second valve means for flowing liquid therethrough to actuate said mechanism to render the latter operable to close said drain outlet to retain liquid in said compartment, said third switch being activated by a third actuating member, said second switch remaining activated by a second actuating member after said third switch is activated by said third actuating member, said first switch being activated by a first actuating member which maintains said first valve means open for a sufficient interval of time after said drain outlet is closed by said mechanism to provide an adequate supply of liquid in said compartment for washing dishes by circulating liquid through said compartment and which thereafter functions to inactivate said first switch to deenergize said first valve means to stop admitting liquid into said compartment, conduit means including a receptacle for holding a body of detergent communicating between said second valve means and said compartment, said receptacle functioning to mix detergent with liquid flowing thereto from said second valve means and delivering the mixture to said compartment, said first switch subsequently being reactivated by said first actuating member to energize said first valve means to admit liquid again into said compartment after an interval of time representing a washing period during which said driving motor remains energized and is operable to drive said liquid circulating means and recirculate liquid retained in said compartment, said third switch being inactivated by said third actuating member when the washing period terminates to deenergize said second valve means to shut off flow of liquid through said conduit means to said compartment through said receptacle and render said mechanism inoperable to close said drain outlet whereby liquid will drain from said compartment, said second switch remaining activated by said second actuating member after said third switch is inactivated by said third actuating member, and said first, second and third actuating members being inactivated by said first, second and third switches, respectively, to deenergize said first and second valve means and said drive motor after an interval of time representing a rinse period.

2. Dishwashing apparatus as set forth in claim 1 in which, when the pre-rinse period commences, said sequence control means initially functions to energize said first valve means by said first actuating member and after a short interval of time functions to energize said drive motor by said second actuating member.

3. Dishwashing apparatus as set forth in claim 1 in which, at the conclusion of said washing period, said sequence control means initially functions to energize said first valve means by said first actuating member and after a short interval of time functions to deenergize said second valve means by said third actuating member.

4. Dishwashing apparatus as set forth in claim 1 which includes pressure reducing means in said conduit means between said second valve means and said receptacle for reducing the pressure of liquid flowing from said second valve means to said receptacle.

5. Dishwashing apparatus as set forth in claim 1 which includes a control device comprising a casing having an inlet and an outlet and a passageway therebetween, a valve member in said passageway movable between open and closed positions, a first connection between the inlet and said first valve means, said control device including means for biasing said control member in a first direction to its closed position, said valve member being held and maintained in its closed position responsive to a first force developed by liquid under pressure in said first connection when said first valve means is energized at the beginning of the pre-rinse period, an element in said device movable between a first inactive position and a second active position, said casing having a chamber defined in part by said element and a wall portion of said casing having an opening, a second connection between the last-mentioned opening and said second valve means to move said element from its inactive position to its active position to impart movement to said valve member from its closed to its open position in a second direction opposite to its first direction against said biasing means responsive to a second force developed by liquid under pressure in said second connection which is less than said first force when said first valve means is deenergized and said second valve means is energized during the washing period, said sequence control means at the conclusion of said washing period functioning to initially energize said first valve means and subsequently deenergize said second valve means, whereby said valve member remains in its open position at the commencement of and during the rinse period to enable liquid to flow from the inlet to the outlet of said control device, a vessel for wetting agent, means for supplying wetting agent from a source of supply to said vessel before the commencement of rinsing period, and means utilizing liquid flowing from the outlet of said control device during the rinse period to effect flow of wetting agent from said vessel to said compartment.

6. Dishwashing apparatus as set forth in claim 5 which includes a pipe coil disposed in said vessel in heat exchange relation with wetting agent therein and having one end thereof connected to receive liquid from the outlet of said control device, the wetting agent supplying means functioning to fill said vessel with wetting agent before the commencement of the rinsing period, said first valve means when energized being adapted to admit heated liquid into said compartment, said means for conducting liquid from said vessel to said compartment comprising a riser pipe extending upward from said vessel and in communication therewith, and means responsive to the flow of the heated liquid through said pipe to expel a small quantity of the wetting agent drop by drop through said riser pipe for flow to said compartment.

7. Dishwashing apparatus as set forth in claim 6 in which a wire is disposed lengthwise within said riser pipe for reducing the cross-sectional flow area of said pipe.

8. Dishwashing apparatus as set forth in claim 6 in which said vessel is formed with an inlet opening at the bottom thereof, said means for supplying wetting agent to said vessel being in communication therewith at the inlet opening, and a one-way valve at the inlet opening which functions to enable wetting agent to flow in one direction through said supply means into said vessel.

9. Dishwashing apparatus as set forth in claim 6 in which said pipe coil is connected to a vertical pipe which is disposed outside said vessel alongside said riser pipe and through which liquid flows upward therein.

References Cited by the Examiner

UNITED STATES PATENTS

| | | | |
|---|---|---|---|
| 872,561 | 12/07 | Fess | 134—106 X |
| 2,155,273 | 4/39 | Jones | 134—57 |
| 2,266,205 | 12/41 | Hunter | 134—57 |
| 2,368,563 | 1/45 | Palmieri | 134—93 |
| 2,592,885 | 4/52 | Fox et al. | 134—101 X |
| 2,867,224 | 1/59 | Martiniak et al. | 134—58 |
| 2,941,725 | 6/60 | Federighi et al. | 134—57 |
| 3,049,133 | 8/62 | Jacobs | 134—95 X |
| 3,060,946 | 10/62 | Lantz | 134—140 X |

FOREIGN PATENTS

| | | |
|---|---|---|
| 475,562 | 7/51 | Canada. |
| 495,226 | 8/53 | Canada. |
| 1,021,982 | 2/53 | France. |

CHARLES A. WILLMUTH, *Primary Examiner.*